US006932945B2

(12) United States Patent
Hertzler

(10) Patent No.: US 6,932,945 B2
(45) Date of Patent: Aug. 23, 2005

(54) ADSORBENT BASED GAS DELIVERY SYSTEM WITH INTEGRATED PURIFIER

(75) Inventor: Benjamin Lee Hertzler, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 578 days.

(21) Appl. No.: 09/884,406

(22) Filed: Jun. 19, 2001

(65) Prior Publication Data

US 2002/0192126 A1 Dec. 19, 2002

(51) Int. Cl.[7] .................................................. B01D 53/02
(52) U.S. Cl. ........................................ 422/171; 422/190
(58) Field of Search ................................ 422/171, 177, 422/190; 95/90, 900, 901, 902; 222/3, 464.2, 189.1; 206/0.7; 96/134, 135

(56) References Cited

U.S. PATENT DOCUMENTS

| | | | | | |
|---|---|---|---|---|---|
| 1,821,549 | A | * | 9/1931 | Hornor et al. | 422/188 |
| 3,675,392 | A | * | 7/1972 | Reighter | 95/96 |
| 4,032,311 | A | * | 6/1977 | Bohmrich et al. | 55/385.4 |
| 5,409,526 | A | | 4/1995 | Zheng et al. | 96/132 |
| 5,518,528 | A | | 5/1996 | Tom et al. | 95/103 |
| 5,704,965 | A | | 1/1998 | Tom et al. | 95/95 |
| 5,704,967 | A | | 1/1998 | Tom et al. | 96/143 |
| 5,761,910 | A | | 6/1998 | Tom | 62/46 |
| 5,851,270 | A | | 12/1998 | Olander | 96/144 |
| 6,125,131 | A | * | 9/2000 | Brandes et al. | 372/51 |
| 6,132,492 | A | | 10/2000 | Hultquist et al. | 95/45 |
| 6,557,591 | B2 | * | 5/2003 | Pearlstein et al. | 141/11 |
| 6,572,688 | B2 | * | 6/2003 | Irven et al. | 96/135 |
| 6,660,063 | B2 | * | 12/2003 | Tom et al. | 95/90 |

FOREIGN PATENT DOCUMENTS

| | | |
|---|---|---|
| EP | 1 134 023 A1 | 9/2001 |

* cited by examiner

*Primary Examiner*—Jonathan Johnson
(74) *Attorney, Agent, or Firm*—Geoffrey L. Chase

(57) ABSTRACT

An adsorbent based gas delivery system is provided which includes a storage and dispensing vessel having a gas outlet conduit and an interior section containing a solid-phase physical sorbent medium having physically sorptive affinity for a gas with the sorbent medium having the gas physically sorptively loaded thereon. A purifier is provided which includes at least one layer of purification media located in the interior section of the storage and dispensing vessel wherein the purification media is located adjacent to the gas outlet conduit of the vessel and provides that any gas desorbed from the sorbent medium must pass through and contact the purification media prior to exiting the vessel through the outlet conduit.

16 Claims, 3 Drawing Sheets

ADSORBENT BASED GAS DELIVERY SYSTEM WITH INTEGRATED PURIFIER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to storage and dispensing systems for the selective dispensing of fluids from a vessel in which the fluid components are sorptively retained by a solid sorbent medium, and are desorptively released from the sorbent medium in the dispensing operation. More specifically, this invention relates to a storage and dispensing system of a type which provides superior gas purities from adsorbent based gas delivery systems.

The objective of the present invention is to provide superior gas purities from adsorbent based gas delivery systems. Currently, adsorbent based gas delivery systems are used, for example, in the semiconductor industry as a means of supplying hazardous gases in a safe manner. This is currently achieved by adsorbing the hazardous gas on an adsorbent substrate. The gas is then removed (desorbed) by applying vacuum to the system. In this type of system, impurities can also be co-desorbed during the gas removal phase. The impurities may originate either from the adsorbent media, the vessel package, or from the source gas itself. The present invention integrates a purifier with the adsorbent based delivery system so that any impurities that may be present in the system are removed from the gas prior to the gas exiting the vessel. In the semiconductor industry, for example, this is particularly important because gas phase impurities can contaminate the semiconductor device during manufacture and possibly lead to a reduction in device yield.

Toxic and other hazardous specialty gases are used in a number of industrial applications, including semiconductor device fabrication. Many users of these hazardous specialty gases are concerned about the possibility of an unintentional release. By virtue of having a positive gauge pressure, pressurized gases in cylinders will be released immediately once a shut-off valve attached to the pressurized cylinder is opened. Even with a gas-tight outlet cap in place (as required for most hazardous gases), unintentional opening of the valve can lead to serious consequences when the cap is removed. Although always undesirable, a hazardous gas release may be particularly undesirable in semiconductor processing applications. Such a release would necessitate a partial or complete evacuation of the semiconductor processing factory, leading to substantial losses in scrap product and unscheduled downtime. Also, the sensitive and expensive equipment used in semiconductor processing factories may be damaged by exposure to even traces of the hazardous gas. Adsorbent based gas delivery systems are one type of system currently used to provide hazardous gases safely.

For example, Knollmueller (U.S. Pat. No. 4,744,221) describes a process of adsorbing a gas onto a solid sorbent so that the equilibrium pressure of the gas is reduced inside of a vessel. By heating the vessel, the equilibrium pressure in the vessel could be increased and permit the delivery of the gas at above-atmospheric pressure.

In their "SDS" system, Tom, et al. (U.S. Pat. No. 5,518,528 and subsequently U.S. Pat. Nos. 5,704,965 and 5,704,967) improved on this concept by using a sorbent where the gas could be released without substantial decomposition by reducing the downstream pressure. Here, a process and apparatus is disclosed which includes a vessel that holds a solid-phase sorbent medium at pressure, a sorbate gas physically adsorbed on the sorbent medium, and a dispensing assembly that provides desorbed gas at a pressure below that of the interior pressure of the vessel. No provision is disclosed concerning the purification of the desorbed gas inside the vessel. These applications are fully incorporated by reference herein.

Additionally, Zheng (U.S. Pat. No. 5,409,526) discloses a cylinder having a valve with two internal ports. One internal port is used to fill the cylinder while the other is fitted with a unit which removes particulates and impurities from the gas as it leaves the cylinder. The unit comprises an inlet, a first filter for removing coarse particulates, layers of adsorbent for removing impurities, and a second filter for removing fine particulates. This system, however, is not an adsorbent based system.

Tom (U.S. Pat. No. 5,761,910) teaches a system for the storage and on-demand dispensing of a fluid that is sorbable on a physical sorbent. Subsequent to sorption, the fluid is desorbable from the sorbent by pressure mediated desorption and/or thermally-mediated desorption. No provision is made to purify the gas exiting the vessel within the vessel.

Olander (U.S. Pat. No. 5,851,270) discloses a gas storage and dispensing system in which a gas is sorptively retained on a bed of physical adsorbent material in a containment vessel. Gas is desorbed for selective dispensing from the vessel. A gas-flow resistance-reducing structure such as a gas-permeable porous tube, inert packing, or dispersed inert material is provided within the vessel to reduce the resistance to flow of desorbed gas from the bed of adsorbent material during the dispensing operation. Again, no provision is made to purify the gas exiting the vessel within the vessel.

In the past, most efforts have focused on either purifying the gas after it exits the adsorbent based gas delivery system, improving the purity of the fill gas, or tightly controlling the quality of the adsorbent media. It is not believed that any patents exist on improving the purity of the adsorbent based gases, and no prior attempt has been made to purify the desorbed gas in a device inside the container vessel.

It is principally desired to provide an adsorbent based gas delivery system with an integral purifier.

It is further desired to provide an adsorbent based gas delivery system with an integral purifier that costs less than the cost of an adsorbent based gas delivery system with a separate purifier.

It is further desired to provide an adsorbent based gas delivery system with an integral purifier where the purifier is integral with the vessel such that appropriate amounts of purification media can be provided for the gas delivery system vessel where the media will not become exhausted due to, for example, use on other vessels.

It is still further desired to provide an adsorbent based gas delivery system with an integral purifier that includes provision to add gas to the gas storage vessel of the system without having the gas pass through the purifier when entering the vessel during filling.

Finally, it is desired to provide an adsorbent based gas delivery system with an integral purifier where sources of leaks of hazardous gases from fittings and valving typically required for an external purifier are minimized.

BRIEF SUMMARY OF THE INVENTION

The present invention is directed to an adsorbent based gas delivery system which includes a storage and dispensing vessel having a gas outlet conduit and an interior section containing a solid-phase physical sorbent medium having physically sorptive affinity for a gas with the sorbent medium having the gas physically sorptively loaded thereon. A purifier is provided which includes at least one layer of purification media located in the interior section of the vessel wherein the purification media is located adjacent to the gas outlet conduit of the vessel and provides that any gas desorbed from the sorbent medium must pass through and contact the purification media prior to exiting the vessel through the outlet conduit.

The purification media may be catalyst based, adsorbent based or include both catalyst based and adsorbent based media.

The purifier may include a purifier conduit having one end sealed to the gas outlet conduit of the vessel and a second end open to the interior section of the vessel containing the solid-phase physical sorbent medium. The purifier conduit includes at least one layer of purification media disposed therein. Any desorbed gas withdrawn from the vessel must pass through the purifier conduit.

The purifier may include at least one layer of purification media adjacent to and covering the gas outlet conduit of the vessel, wherein at least one layer of purification media is disposed within the vessel and provides that any desorbed gas passes from the interior section of the vessel through and makes contact with at least one layer of purification media to reach the gas outlet conduit of the vessel.

The purifier may include a purifier conduit with one end of the purifier conduit being sealingly attached to the gas outlet conduit and a second end open to the interior section of the vessel containing the solid-phase physical sorbent medium. The purifier conduit includes at least one layer of purification media disposed therein. The purifier further includes at least one layer of purification media adjacent to and covering the second end of the purifier conduit whereby any desorbed gas withdrawn from the vessel must first pass through and contact the at least one layer of purification media adjacent to the second end of the purifier conduit and then through the purifier conduit to reach the outlet conduit of the vessel.

The storage and dispensing vessel may further include a gas inlet conduit for supplying an inlet gas from an external source into the vessel where the gas inlet conduit is separate from the gas outlet conduit. Here, the inlet gas does not pass through and contact the purification media.

Alternatively, an adsorbent based gas delivery system is provided that includes a storage and dispensing vessel having a gas outlet conduit and an interior section containing a solid-phase physical sorbent medium having physically sorptive affinity for a gas where the sorbent medium has the gas physically sorptively loaded thereon. Here, a purifier includes a purification media generally homogeneously mixed with the sorbent medium in the interior section of the vessel such that substantially any gas desorbed from the sorbent medium must pass through and contact the purification media prior to exiting the vessel through the outlet conduit.

DETAILED DESCRIPTION OF THE INVENTION

Figure 1:
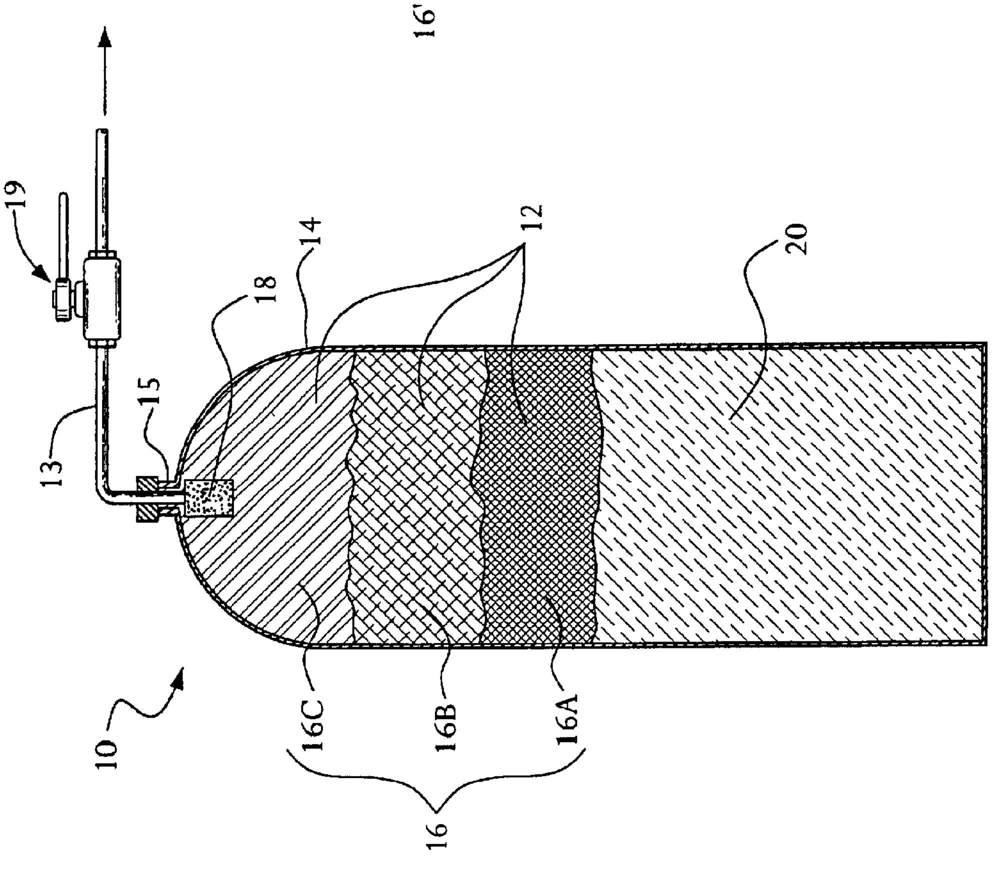
FIG. 1 is a simplified, front, elevational view of an adsorbent based gas delivery system in accordance with a first preferred embodiment of the present invention.

Referring now to the drawings wherein like numbers refer to like elements throughout the several views, there is shown in FIG. 1 an adsorbent based gas delivery system 10 with integrated purifier 12 in accordance with one preferred embodiment of the present invention.

Figure 2:
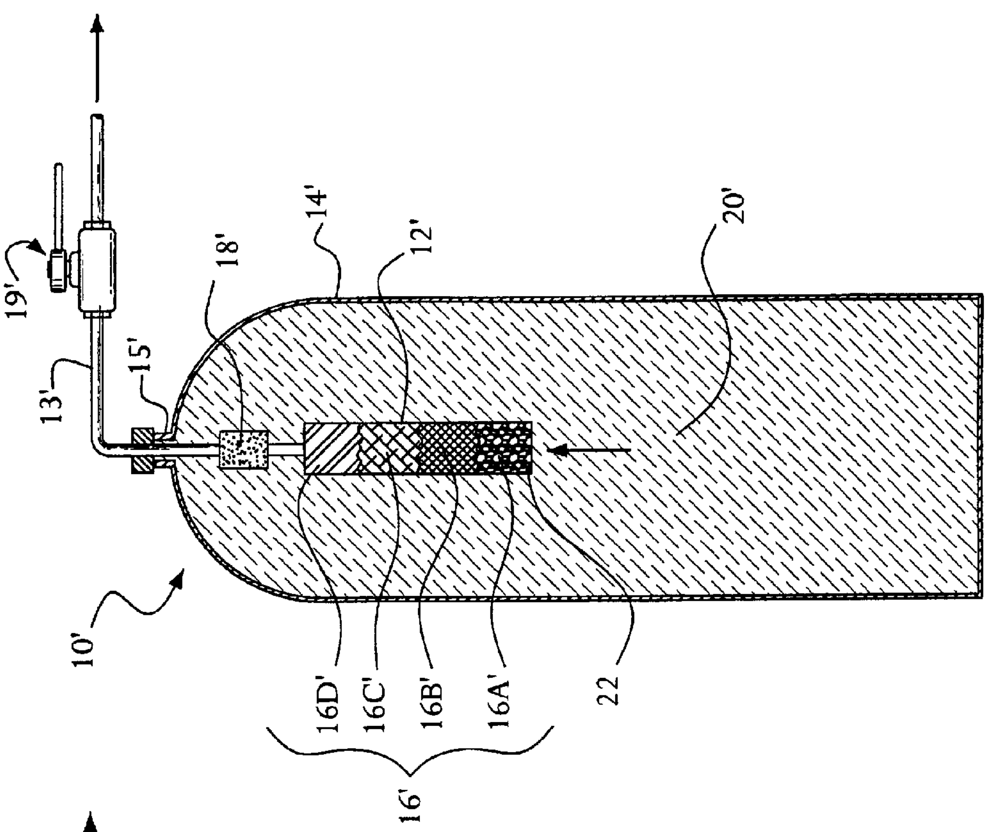
FIG. 2 is a simplified, front, elevational view of an adsorbent based gas delivery system in accordance with a second preferred embodiment of the present invention.

The delivery system 10 consists of an adsorbent based delivery system vessel 14 in combination with the integrated purifier 12. The integrated purifier 12 has at least one layer of purification media 16 (including layers 16A, 16B , . . . **16*n*), that can be either catalyst or adsorbent based, or some combination thereof, including at least one and preferably multiple adsorbents and catalysts. A separate filter 18 may also be used wherein any gas flow from the interior of the vessel 14 through the vessel outlet 15 must pass through the filter 18. The purifier 12 can either exist as a layered bed arrangement, as shown in the embodiment of FIG. 1, or as contained in a separate purifier assembly, as shown the alternate embodiment of an adsorbent based gas delivery system 10' as can be seen in FIG. 2** as described below. In addition, a combination of the layered bed and separate purifier vessel may also be used (not shown). Also, homogeneously mixed combination of SDS adsorbent and purification media can be used (not shown).

Using the layered bed embodiment of FIG. 1, the gas is desorbed from the main gas storage adsorbent medium or media 20, for example, via either heat or pressure as the driving force. The desorbed gas, as well as any associated impurities, then sequentially pass through the one or more layers 16A, 16B , . . . , **16*n* of the purification media 16 of the vessel 14 where the impurities are either adsorbed on the purification media 16 itself, or they are reacted to form a third compound which is subsequently separated either inside or outside the system vessel 14. The desorbed gas then passes through the optional filter 18 and out through vessel outlet 15 via vessel outlet conduit 13. Vessel valve 19 provides for adjusting the gas flow out of the vessel 14**.

In the embodiment of FIG. 2, the integrated purifier 12' includes a separate conduit 22 in which the purification media 16' (including layers 16A', 16B', . . . 16*n*') is encased. Any gas desorbed by the gas storage adsorbent media 20' must pass sequentially through the one or more layers of the purifier 12 before passing through the optional filter 18' and out the outlet 15' of the vessel 14' via vessel outlet conduit 13' and through vessel valve 19'.

Figure 4:
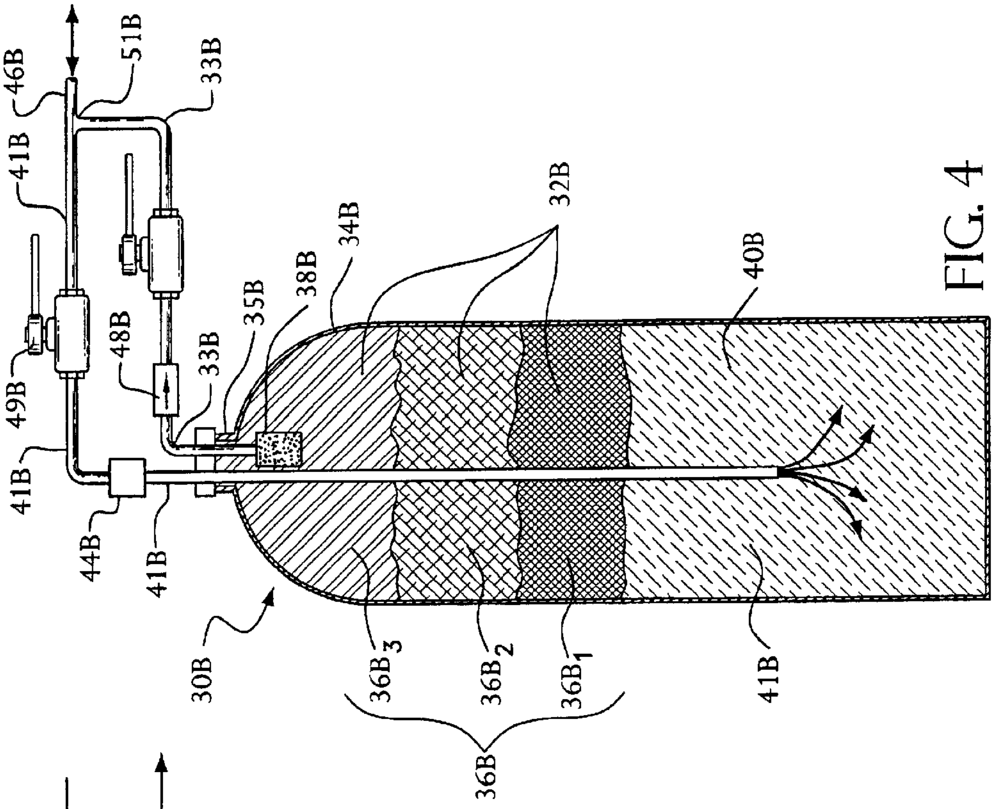
FIG. 4 is a simplified, front, elevational view of an adsorbent based gas delivery system in accordance with the first preferred embodiment of the present invention of FIG. 1, but having a gas inlet conduit for filling the gas vessel of the system and where the gas inlet conduit and gas outlet conduit join to form a single conduit.
Figure 3:
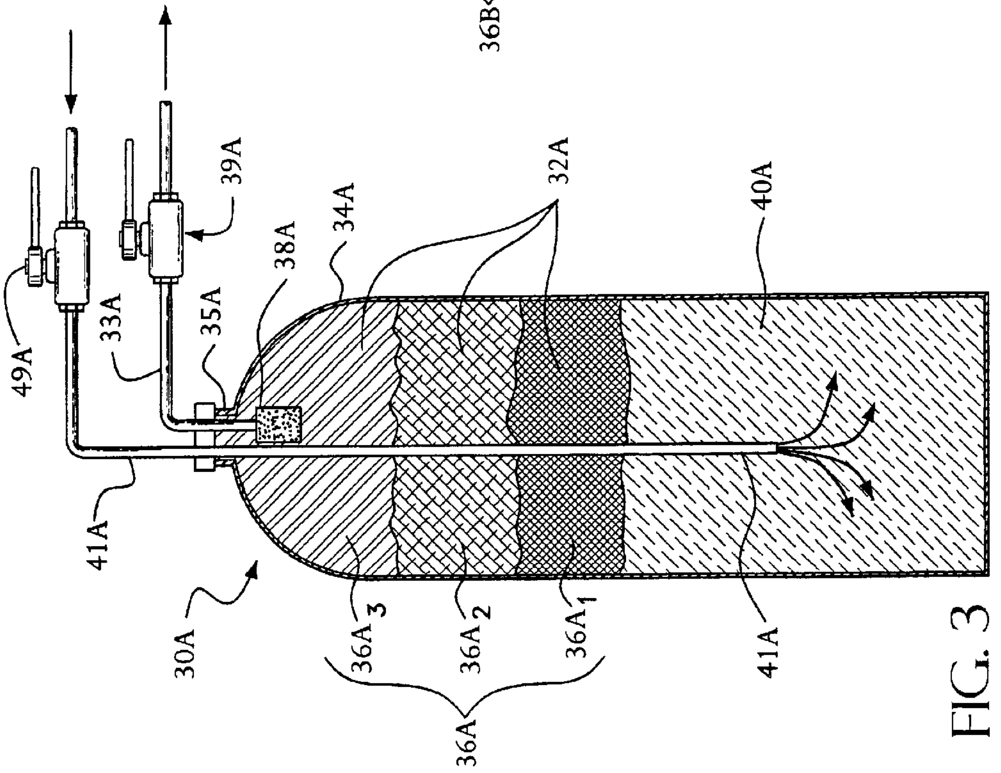
FIG. 3 is a simplified, front, elevational view of an adsorbent based gas delivery system in accordance with the first preferred embodiment of the present invention of FIG. 1, but having a gas inlet conduit for filling the gas vessel of the system.

FIGS. 3 and 4 depict optional configurations of the embodiment depicted in FIG. 1. Again, in FIGS. 3 and 4, adsorbent based gas delivery systems 30A and 30B with integrated purifiers 32A and 32B are disclosed (respectively).

The delivery system 30A consists of an adsorbent based delivery system vessel 34A in combination with the integrated purifier 32A. The integrated purifier 32A has at least one layer of purification media 36A (including layers $36A_1$, $36A_2$, . . . $36A_n$) that can be either catalyst or adsorbent based, or some combination thereof, including at least one and preferably multiple adsorbents and catalysts. A separate filter 38A may also be used wherein any gas flow from the interior of the vessel 34A through the vessel outlet 35A, via vessel outlet conduit 33A, must pass through the filter 38A.

Using the layered bed configuration of FIG. 3, the gas is desorbed from the main gas storage adsorbent medium or media 40A, for example, via either heat or pressure as the driving force. The desorbed gas, as well as any associated impurities, then sequentially pass through the one or more layers $36A_1$, $36A_2$, . . . , $36A_n$ of the purifier 36A of the vessel 34A where the impurities are either adsorbed on the purification media 36A itself, or they are reacted to form a third compound which is subsequently separated either inside or outside the system vessel 34A. The desorbed gas then passes through the optional filter 38A and out through vessel outlet 35A via the vessel outlet conduit 33A. Vessel valve 39A provides for closing and adjusting the gas flow out of the vessel.

In the configuration of FIG. 3, there is also shown a gas inlet conduit 41A and valve 49A for the introduction of gases into the vessel for, for example, filling the vessel. As can clearly be seen in FIG. 3, it is desirable for the gas inlet conduit 41A to extend through the vessel outlet and through all layers of the purifier 36A such that any fresh inlet gas being introduced into the system vessel 34A does not pass directly through and make contact with any part of the purification media 36A.

The gas delivery system 30B of FIG. 4 is substantially the same as that of the gas delivery system 30A of FIG. 3 except that a single gas conduit, referred to by the reference number 46B, may be used to both fill the vessel 34B and withdraw gas from the vessel. In the interests of brevity the common structural details of the delivery system 30B will be given the same reference numbers as shown with respect to the gas delivery system 30A, with the suffix of the letter "B" rather than the letter "A", and their construction and operation will not be reiterated. Only the different features will be described in detail.

Here, the gas inlet conduit 41B extends through valve 49B and passes by rupture disk 44B and into vessel 34B. The vessel outlet conduit 33B extends out of the vessel 34B, passes through check valve 48B and then through valve 39B. The gas inlet conduit 41B and the vessel outlet conduit 33B then join to form a single conduit 46B at tee 51B such that gas conduit 46B may be used for both filling of the vessel 34B or withdrawing gas from the vessel 34B depending upon the position of valves 49B and 39B.

Figure 6:
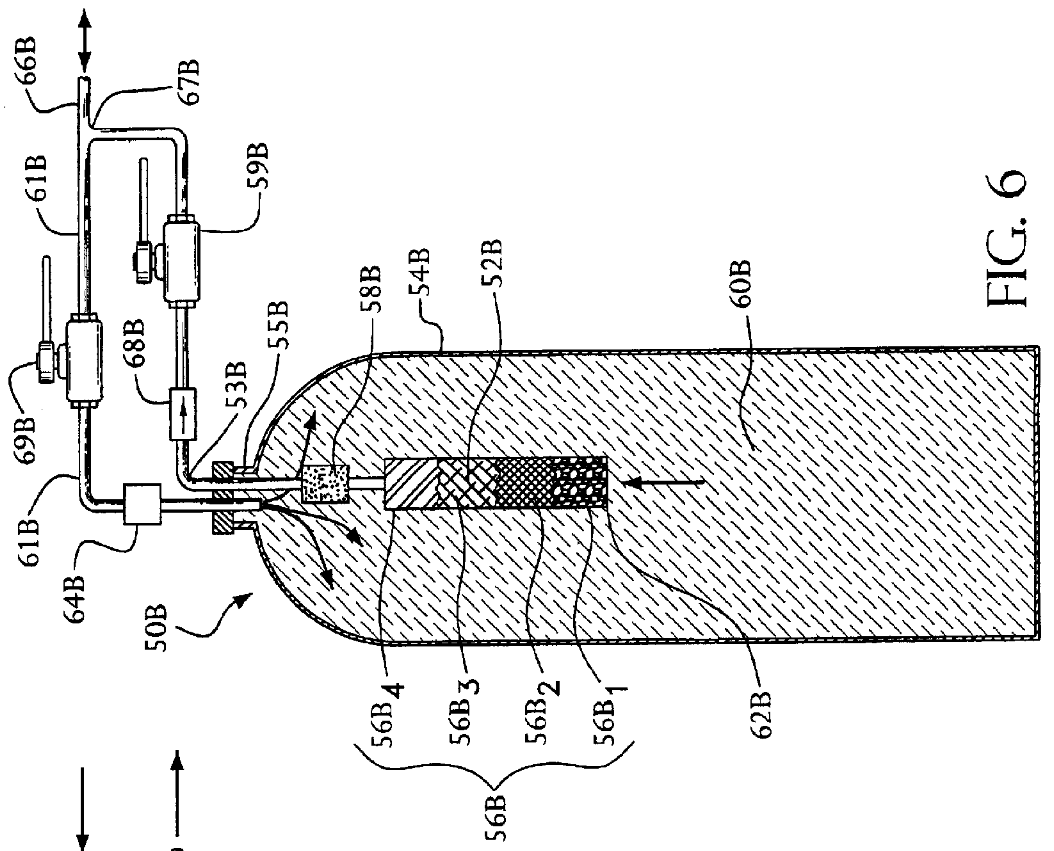
FIG. 6 is a simplified, front, elevational view of an adsorbent based gas delivery system in accordance with the second preferred embodiment of the present invention of FIG. 2, but having a gas inlet conduit for filling the gas vessel of the system and where the gas inlet conduit and gas outlet conduit join to form a single conduit.
Figure 5:
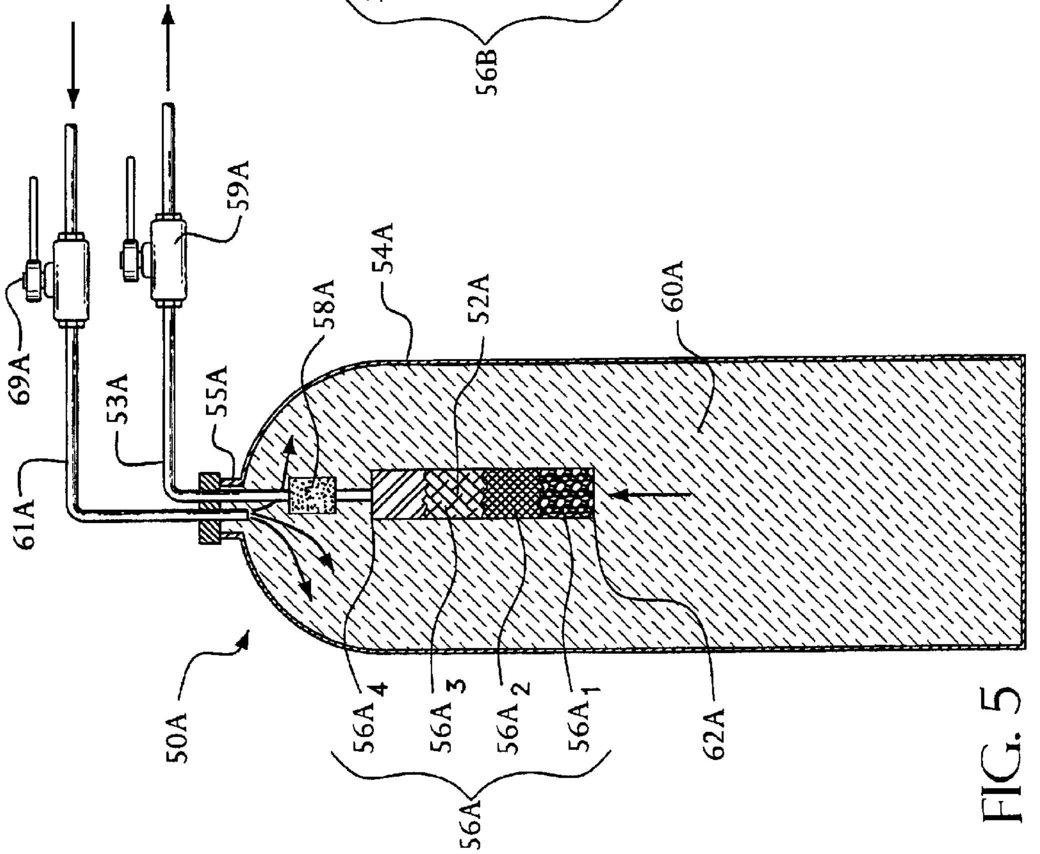
FIG. 5 is a simplified, front, elevational view of an adsorbent based gas delivery system in accordance with the second preferred embodiment of the present invention of FIG. 2, but having a gas inlet conduit for filling the gas vessel of the system.

The configurations of FIGS. 5 and 6 correspond to the configurations of FIGS. 3 and 4 respectively, but are based upon the embodiment of FIG. 2. In FIG. 5, there is shown an adsorbent based gas delivery systems 50A that utilizes an integrated purifier 52A which includes a separate conduit 62A in which the purification media 56A (including layers $56A_1$, $56A_2$, . . . $56A_n$) is encased. Any gas desorbed by the gas storage adsorbent media 60A must pass sequentially through the one or more layers of the purification media 56A before passing through the optional filter 58A and out the outlet 55A via vessel outlet conduit 53A of the vessel 54A and through vessel valve 59A. Gas inlet conduit 61A and associated valve 69A provide for the vessel 54A to be filled with gas. Valves 59A and 69A control flow of gas in and out of the vessel 54A in a similar manner than that in the embodiment of FIG. 3.

Likewise, in FIG. 6, there is shown an adsorbent based gas delivery system 50B that utilizes an integrated purifier 52B which includes a separate conduit 62B in which the purification media 56B (including layers $56B_1$, $56B_2$, . . . $56B_n$) is encased. This configuration corresponds to the configuration of FIG. 4, but is based upon the embodiment of FIG. 2 rather than FIG. 1. Again, in the interests of brevity, the common structural details of the delivery system 50B will be given the same reference numbers as shown with respect to the gas delivery system 50A, with the suffix of the letter "B" rather than the letter "A", and their construction and operation will not be reiterated. Only the different features will be described in detail.

Here, the gas inlet conduit 61B extends through valve 69B and passes by rupture disk 64B and into vessel 54B. The vessel outlet conduit 53B extends out of the vessel 54B, passes through check valve 68B and then through valve 59B. The gas inlet conduit 61B and the vessel outlet conduit 53B then join to form a single conduit 66B at tee 67B such that gas conduit 66B may be used for both filling of the vessel 54B or withdrawing gas from the vessel 54B depending upon the position of valves 69B and 59B.

Currently, adsorbent based systems exist for delivering hazardous gases to semiconductor tools and processes. However, these existing processes typically either employ external purifiers or provide no purification whatsoever.

In cases where external purifiers would have been used, the described invention offers several benefits. First, external purifiers are typically more costly than the cost of an integrated purifier. Also, with an external purifier, one can never be quite sure as to when the purifier media becomes exhausted since a single purifier may be used to purify multiple vessels with differing impurity levels over time. Also, an external purifier can also provide additional leak sources because of additional fittings and valving that may be present.

In cases where no purification is currently used, the described invention offers even more benefits. The purification media can obviously purify the process gas, which in turn can result in semiconductor yield improvements. Various impurities may originate from the fill gas itself, the adsorbent media, or some secondary interaction between the fill gas (or impurities) and the container package itself, including the adsorbent media. Also, by integrating the purification process with the vessel container, the gas supplier is able to control the overall material balance between the media and the fill gas, thereby insuring that adequate purification media is always available.

Also, many times, gas impurities will vary over time depending on how much gas has been withdrawn from the adsorbent media. Impurity levels can also vary from vessel to vessel due to inconsistency in supply sources. The proposed invention eliminates this variability thereby supplying a more consistent product. This improved consistency generally translates into superior manufacturing process performance characteristics.

Although illustrated and described herein with reference to specific embodiments, the present invention nevertheless is not intended to be limited to the details shown. Rather, various modifications may be made in the details within the scope and range of equivalents of the claims without departing from the spirit of the invention.

I claim:

1. An adsorbent based gas delivery system comprising:

(a) a storage and dispensing vessel having a gas outlet conduit and an interior section containing a solid-phase physical sorbent medium having physically sorptive affinity for a gas, said sorbent medium having said gas physically sorptively loaded on said sorbent medium;

(b) a purifier comprising at least one layer of purification media located in the interior section of said storage and dispensing vessel wherein said at least one layer of purification media is located adjacent to said gas outlet conduit of said vessel and is adapted to provide that any gas desorbed from said sorbent medium must pass through and contact said at least one layer of purification media prior to exiting said vessel through said outlet conduit; and (c) said purification media is a media selected from the group consisting of catalyst based media and adsorbent based media.

2. The adsorbent based gas delivery system of claim 1, wherein the purifier includes layers of both catalyst based and adsorbent based purification media.

3. The adsorbent based gas delivery system of claim 1, wherein said purifier includes a purifier conduit, one end of said purifier conduit being sealingly attached to said gas outlet conduit of said vessel, and a second end of said purifier conduit open to said interior section of said vessel containing said solid-phase physical sorbent medium, said purifier conduit including said at least one layer of purification media disposed in said purifier conduit, whereby any desorbed gas withdrawn from said vessel must pass through said purifier conduit from said end of said purifier conduit open to said interior section containing said solid-phase physical sorbent medium through to said end of said purifier conduit sealingly attached to said gas outlet conduit.

4. The adsorbent based gas delivery system of claim 1, wherein said purifier includes at least one layer of purification media adjacent to and covering said gas outlet conduit of said vessel, wherein said at least one layer of purification media is disposed within said vessel and is adapted to provide that any desorbed gas passes from said interior section of said vessel through and makes contact with said at least one layer of purification media to reach said gas outlet conduit of said vessel.

5. The adsorbent based gas delivery system of claim 1, wherein said purifier includes a purifier conduit, one end of said purifier conduit being sealingly attached to said gas outlet conduit of said vessel, and a second end of said purifier conduit open to said interior section of said vessel containing said solid-phase physical sorbent medium, said purifier conduit including said at least one layer of purification media disposed in said purifier conduit, and wherein said purifier further includes at least one layer of purification media adjacent to and covering said second end of said purifier conduit, whereby any desorbed gas withdrawn from said vessel must first pass through and contact said at least one layer of purification media adjacent to said second end of said purifier conduit and then through said purifier conduit to reach said outlet conduit of said vessel.

6. The adsorbent based gas delivery system of claim 1, wherein said storage and dispensing vessel having a gas outlet conduit further includes a gas inlet conduit for supplying an inlet gas from an external source into said storage and dispensing vessel, said gas inlet conduit separate from said gas outlet conduit.

7. The adsorbent based gas delivery system of claim 6, wherein said gas inlet conduit is adapted to provide that said inlet gas does not pass through and contact said purification media.

8. The adsorbent based gas delivery system of claim 4, wherein said storage and dispensing vessel having a gas outlet conduit further includes a gas inlet conduit for supplying an inlet gas from an external source into said storage and dispensing vessel through a conduit extending through said at least one layer of purification media adjacent to and covering said gas outlet conduit, whereby said inlet gas entering said vessel through said gas inlet conduit does not pass through and contact said purification media.

9. An adsorbent based gas delivery system comprising:

(a) a storage and dispensing vessel having a gas outlet conduit and an interior section containing a solid-phase physical sorbent medium having physically sorptive affinity for a gas, said sorbent medium having said gas physically sorptively loaded on said sorbent medium; and (b) a purifier comprising a purification media generally homogeneously mixed with said sorbent medium in the interior section of said storage and dispensing vessel such that substantially all gas desorbed from said sorbent medium must pass through and contact said purification media prior to exiting said vessel through said outlet conduit.

10. An adsorbent based gas delivery system comprising:

(a) a storage and dispensing vessel having a gas outlet conduit and an interior section containing a solid-phase physical sorbent medium having physically sorptive affinity for a gas, said sorbent medium having said gas physically sorptively loaded on said sorbent medium;

(b) a purifier comprising at least one layer of purification media located in the interior section of said storage and dispensing vessel wherein said at least one layer of purification media is located adjacent to said gas outlet conduit of said vessel and is adapted to provide that any gas desorbed from said sorbent medium must pass through said at least one layer purification media prior to exiting said vessel through said outlet conduit;

(c) said storage and dispensing vessel having a gas inlet conduit for supplying said gas from an external source into said vessel, said gas inlet conduit separate from said gas outlet conduit, and (d) said purification media is a media selected from the group consisting of catalyst based media and adsorbent based media.

11. The absorbent based gas delivery system of claim 10, wherein said gas inlet conduit is adapted to provide that said inlet gas does not pass through said purifier.

12. The adsorbent based gas delivery system of claim 10, wherein the purifier includes layers of both catalyst based and adsorbent based purification media.

13. The adsorbent based gas delivery system of claim 10, wherein said purifier includes a purifier conduit, one end of said purifier conduit being sealingly attached to said gas outlet conduit of said vessel, and a second end of said purifier conduit open to said interior section of said vessel containing said solid-phase physical sorbent medium, said purifier conduit including said at least one layer of purification media disposed in said purifier conduit, whereby any desorbed gas withdrawn from said vessel must pass through said purifier conduit from said end of said purifier conduit open to said interior section containing said solid-phase physical sorbent medium through to said end of said purifier conduit adjacent to said gas outlet conduit.

14. The adsorbent based gas delivery system of claim 10, wherein the purifier includes at least one layer of purification media adjacent to and covering said gas outlet conduit of said vessel, wherein said at least one layer of purification media is disposed within said vessel and is adapted to provide that any desorbed gas passes from said interior section of said vessel through and makes contact with said at least one layer of purification media to reach said outlet conduit of said vessel.

15. The adsorbent based gas delivery system of claim 10, wherein said purifier includes a purifier conduit, one end of said purifier conduit being sealingly attached to said gas outlet conduit of said vessel, and a second end of said purifier conduit open to said interior section of said vessel containing said solid-phase physical sorbent medium, said purifier conduit including said at least one layer of purification media disposed in said purifier conduit, and wherein said purifier further includes at least one layer of purification media adjacent to and covering said second end of said purifier conduit, whereby any desorbed gas withdrawn from said vessel must first pass through and contact said at least one layer of purification media adjacent to said second end of said purifier conduit and then through said purifier conduit to reach said outlet conduit of said vessel.

16. The adsorbent based gas delivery system of claim 14, wherein said storage and dispensing vessel having a gas outlet conduit further includes a gas inlet conduit for supplying an inlet gas from an external source into said storage and dispensing vessel through a conduit extending through said at least one layer of purification media adjacent said gas outlet conduit, whereby said inlet gas entering said vessel through said gas inlet conduit does not pass through and contact said purifier.

* * * * *